UNITED STATES PATENT OFFICE.

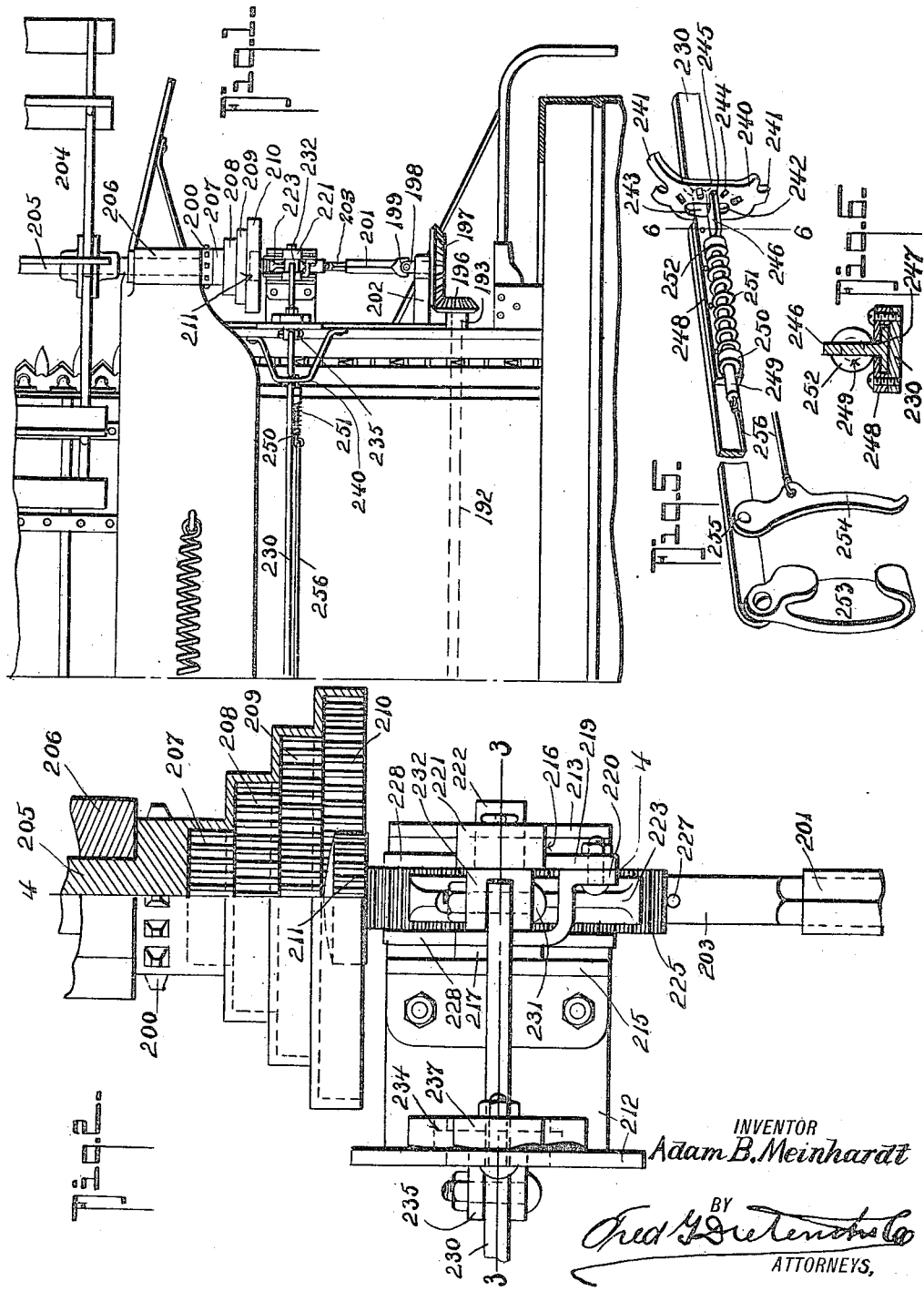

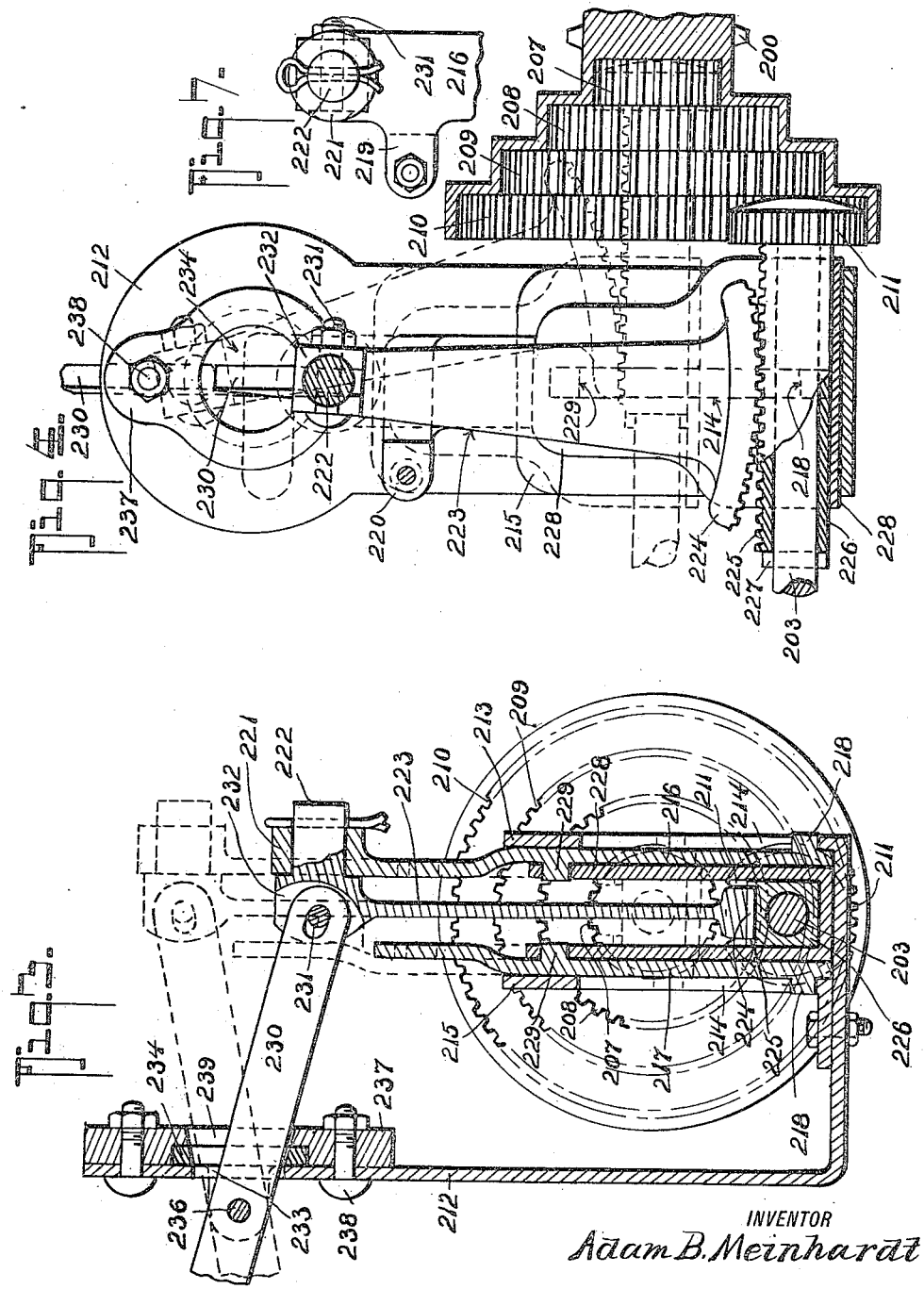

ADAM B. MEINHARDT, OF PAXICO, KANSAS.

HARVESTER-REEL-OPERATING MECHANISM.

1,224,001.  Specification of Letters Patent.  Patented Apr. 24, 1917.

Original application filed December 30, 1915, Serial No. 69,469. Divided and this application filed June 10, 1916. Serial No. 102,857.

*To all whom it may concern:*

Be it known that I, ADAM B. MEINHARDT, residing at Paxico, in the county of Wabaunsee and State of Kansas, have invented certain new and useful Improvements in Harvester-Reel-Operating Mechanism, of which the following is a specification.

My invention relates to certain new and useful improvements in harvesters and it more particularly relates to the mechanism for operating the reels of the same. The present invention is principally designed as a part of the complete harvester disclosed in my application Serial No. 69469, filed December 30, 1915, of which application the present one is a divisional part.

My invention provides means, under control of the operator, whereby the speed of the reel may be varied, as desired, for the reason that, the employment of a one-speed reel (the common practice in harvesters in use today) causes much of the grain to be thrown to the back end of the platform canvas and the grain being there elevated, finds its way into the bundle above the tie band, thus providing unbound grain in the bundles which becomes lost as scatterings in the field when a bundle is handled. This objectionable feature is avoided by the employment of my invention.

The invention also resides in those novel details of construction, combination and arrangement of parts, all of which will be first fully described, and then be specifically pointed out in the appended claims, reference being had to the accompanying drawings, in which:

Figure 1 is a detail plan view of a portion of the harvester with the present invention applied.

Fig. 2 is an enlarged top plan view and part horizontal section of the reel gear drive and speed changing mechanism.

Fig. 3 is a vertical section on the line 3—3 of Fig. 2.

Fig. 4 is a vertical section on the line 4—4 of Fig. 2.

Fig. 5 is a detail perspective view of the reel gear shifting rod and the latch and latch plate coöperating therewith.

Fig. 6 is a cross section on the line 6—6 of Fig. 5.

Fig. 7 is a detail elevation of a portion of the mechanism shown in Fig. 2.

Referring now to the accompanying drawings, in which like numerals and letters of reference indicate like parts in all of the figures, 192 is the reel driving shaft which is mounted in bearings 193. At its front end, the shaft 192 has a beveled gear 196 that meshes with a bevel gear 197 on a transmission shaft 198 that is journaled in a bearing 202 and comprises the telescoping sections 201 and 203 and universal joint 199. 203 is the pinion carrying shaft of the change-speed gear mechanism, (see Figs. 2, 3 and 4).

By reference to Figs. 2 to 7, inclusive, the construction of the reel change-speed gearing, which constitutes the present invention, will be clearly understood. The reel 204 (see Fig. 1) is of any desired type and may have its shaft secured to the shaft which is journaled in a bearing 206, on the end of the upper or operator's platform 207. While for purposes of illustration, I have shown a reel coupled directly with the gearing 207, etc., yet, as I make no claims *per se* to the reel construction, I desire it understood that any well-known or approved type of reel may be used, either a reel of the relatively permanently located type, or a reel of the adjustable type, which is swingably sustained to be raised or lowered and when the latter type of reel is employed its shaft may be driven by a sprocket chain (not shown) taking over the sprocket 200.

The shaft 205 has a set of internal gears 207 and 210 inclusive on its end the gears increasing progressively in diameter from the smallest gear 207 to the largest gear 210, the several gears being preferably formed in a single shell and they are designed to be engaged by the driving pinion 211 on the shaft 203, 212 is a bracket support (see Figs. 2 and 3) which has a fixed standard 213 with a vertical slot 214 and which also has a removable standard 215 with a similar slot 214. A vertically shiftable frame composed of sections 216—217, having lugs 218 to enter the slots 214, serves to sustain the pivoted gear advancing and withdrawing sector 223. The frame section 216 has a lateral arm 219 (see Fig. 7) to which the yoke arm 220 (see Fig. 4) is bolted and it also has an upward extension that terminates in a bearing 221 (see Fig. 3) for the stub shaft 222 of the gear shifting sector. The sector 223 has a gear cut face 224 (see Fig. 4) to engage the rack 225 of the box 226 in which the shaft 203 is journaled, the shaft being held from movement axially in the box by a pin 227. The box 226 is slidably carried in a sling 228 which is suspended on lugs 229 that project from the opposing frame sections 216—217.

The gear 211 is raised and lowered and shoved in and out to engage any one of the gear surfaces 207—210 inclusive, by a lever 230 that has a pin and slot connection 231 with the gear sector fulcrum end 232, the said end being bifurcated to receive the end of the lever.

The lever 230 is so mounted as to have a turning movement on its longitudinal axis and also a pivoted movement up and down, as will be clearly seen by reference to Figs. 1, 2, 3 and 5. The bracket 212 has a hole 233 through which the lugs 235 from a ring 234 project. The ring 234 is held to swivel on its axis by a plate 237 that is held over it by bolts 238, the plate having a hole 239 for the lever to work through. As the lever 230 is held to its different positions by a latch device, the construction of which is best shown in Figs. 5 and 6, by reference to which it will be observed that a plate 240 is sustained by arms 241 in a fixed position and it has a vertical slot 242 through which the rounded part 243 of the lever 230 passes. The plate 240 also has position determining recesses 244 for the latch finger 245 of the latch 246. The latch 246 has a flange 247 to operate in the slideway 248 and it also has a rod portion 249 to move in the bearing 250, the latch being projected by a spring 251 located between the bearing 250 and a collar 252 on the rod 249. The lever 230 has a handle 253 adjacent to the operator's seat, and it also has a latch operating lever 254 fulcrumed at 255 and connected by a rod 256 with the latch member 249.

It will be observed from the foregoing that in order to change the speed of operation of the reel without stopping the shaft 192, the operator simply manipulates the lever 230, to raise or lower the shaft 203 and the gear 211 and turns the lever 230 to move the gear 211 in or out into mesh with one or the other of the gear faces 207—208, 209, 210, as may be desired.

From the foregoing description taken in connection with the accompanying drawings, it is thought the complete construction, operation and advantages of my invention will be readily understood by those skilled in the art.

What I claim is:

1. In a mechanism of the character stated, a driving shaft having a pinion, a driven shaft provided with a set of gear sections of progressively increasing diameter with any one of which said pinion is adapted to mesh, of a lever operated device for raising and lowering said pinion to aline with a predetermined gear section, and means operated by the said lever for advancing or withdrawing said pinion to cause said pinion to mesh or unmesh with the particular gear section desired.

2. In a harvester, a driving shaft having a pinion, a reel rotating shaft provided with a set of gear sections of progressively increasing diameter with any one of which said pinion is adapted to mesh, of a support, guide standards on said support, a vertically shiftable frame mounted between said standards, a lever for raising and lowering said frame, a horizontally shiftable bearing box for said pinion shaft, said box having a gear rack, a gear sector pivoted in said shiftable frame and engaged with said rack to advance or withdraw said pinion into or out of position with relation to the selected gear section, and an operative connection between said sector and said lever.

3. In a harvester, a driving shaft having a pinion, a reel rotating shaft provided with a set of gear sections of progressively increasing diameter with any one of which said pinion is adapted to mesh, of a support, guide standards on said support, a vertically shiftable frame mounted between said standards, a lever for raising and lowering said frame, a horizontally shiftable bearing box for said pinion shaft, said box having a gear rack, a gear sector pivoted in said shiftable frame and engaged with said rack to advance or withdraw said pinion into or out of position with relation to the selected gear section, said lever being connected with said sector and a rotatable fulcrum for said lever whereby the lever may be turned on its axis to operate said sector as well as be moved to raise and lower said frame.

4. In a harvester, a driving shaft having a pinion, a reel rotating shaft provided with a set of gear sections of progressively increasing diameter with any one of which said pinion is adapted to mesh, of a support having guide standards, a vertically shiftable frame mounted between said standards, a lever for raising and lowering said frame, a sling mounted in said vertically shiftable support, a horizontally slidable bearing box for said driving shaft mounted in said sling, said box having a gear rack, a gear sector having a stub shaft journaled in a bearing in said vertically shiftable frame and engaging said gear rack to shift the same, said lever being connected to said sector adjacent to its stub shaft axis, a rotatable fulcrum for said lever whereby said lever may be raised and lowered to shift said vertically shiftable frame and may also be turned to oscillate said sector.

5. In an apparatus of the class described, a driving shaft having a pinion, a driven shaft provided with a set of gear sections of different diameters with any one of which said pinion is adapted to mesh, a device for raising and lowering said pinion to aline with a predetermined gear section, a device coöperative with the aforesaid device whereby said pinion may be advanced or withdrawn to mesh or unmesh with the particular gear section desired, and a single operating lever common to both of said devices for actuating the same.

6. In a harvester, a driving shaft having a pinion, a reel rotating shaft provided with a set of gear sections of progressively increasing diameter with any one of which said pinion is adapted to mesh, of a support, guide standards on said support, a vertically shiftable frame mounted between said standards, a lever for raising and lowering said frame, a horizontally shiftable bearing box for said driving shaft, said box having a gear rack, a gear sector pivoted in said shiftable frame and engaged with said rack to advance or withdraw said pinion into or out of mesh with relation to the selected gear section, an operative connection between said sector and said lever, and a latch device for holding said lever immovable in its gear-set positions.

7. In a harvester, a driving shaft having a pinion, a reel rotating shaft provided with a set of gear sections of progressively increasing diameter with any one of which said pinion is adapted to mesh, of a support, guide standards on said support, a vertically shiftable frame mounted between said standards, a lever for raising and lowering said frame, a horizontally shiftable bearing box for said driving shaft, said body having a gear rack, a gear sector pivoted in said shiftable frame and engaged with said rack to advance or withdraw said pinion into or out of position with relation to the selected gear section, said lever being connected with said sector and a rotatable fulcrum for said lever whereby the lever may be turned on its axis to operate said sector as well as be moved to raise and lower said frame, and a latch device for holding said lever immovable in its gear-set positions.

8. In a harvester, a driving shaft having a pinion, a reel rotating shaft provided with a set of gear sections of progressively increasing diameter with any one of which said pinion is adapted to mesh, of a support having guide standards, a vertically shiftable frame mounted between said standards, a lever for raising and lowering said frame, a sling mounted in said vertically shiftable support, a horizontally slidable bearing box for said driving shaft mounted in said sling, said box having a gear rack, a gear sector having a stub shaft journaled in a bearing in said vertically shiftable frame and engaging said gear rack to shift the same, said lever being connected to said sector adjacent to its stub shaft axis, a rotatable fulcrum for said lever whereby said lever may be raised and lowered to shift said vertically shiftable frame and may also be turned to oscillate said sector, and a latch device for holding said lever immovable in its gear-set positions.

ADAM B. MEINHARDT.

Copies of this patent may be obtained for five cents each, by addressing the "Commissioner of Patents, Washington, D. C."